R. BRIGGS.
TIGHTENING AND LOCKING DEVICE FOR ANTISKID CHAINS.
APPLICATION FILED APR. 2, 1917.

1,238,631.

Patented Aug. 28, 1917.

Inventor
Robert Briggs

Witnesses

By

Attorneys

UNITED STATES PATENT OFFICE.

ROBERT BRIGGS, OF BUENA VISTA, COLORADO.

TIGHTENING AND LOCKING DEVICE FOR ANTISKID-CHAINS.

1,238,631.

Specification of Letters Patent.   Patented Aug. 28, 1917.

Application filed April 2, 1917.   Serial No. 159,163.

*To all whom it may concern:*

Be it known that I, ROBERT BRIGGS, a citizen of the United States, and a resident of Buena Vista, in the county of Chaffee and State of Colorado, have invented certain new and useful Improvements in Tightening and Locking Devices for Antiskid-Chains, of which the following is a specification.

The principal object of my invention is to provide a tightening and locking means for anti-skid chains, such as are applied to pneumatic automobile wheel tires, having a lever arrangement for drawing the ends of the chains together, and for positively locking them in drawn and taut position against accidental release.

Another object of the invention is to provide an improved tightening and locking means of the class described, which will be characterized by advantages of simplicity, durability, efficiency in operation, and economy in manufacture and maintenance.

With these and other objects in view which will become apparent as the description proceeds, the invention resides in the construction, combination and arrangement of parts hereinafter more fully described and claimed, and illustrated in the accompanying drawings in which like characters of reference indicate like parts throughout the several figures, of which—

Figure 1:
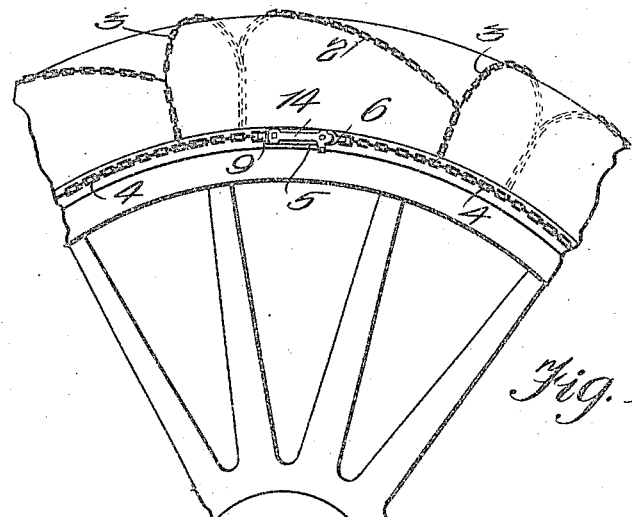
Figure 1 represents a fragmentary view in elevation of an automobile wheel, having a chain thereon equipped with the tightening device constructed in accordance with my invention.
Figure 2:
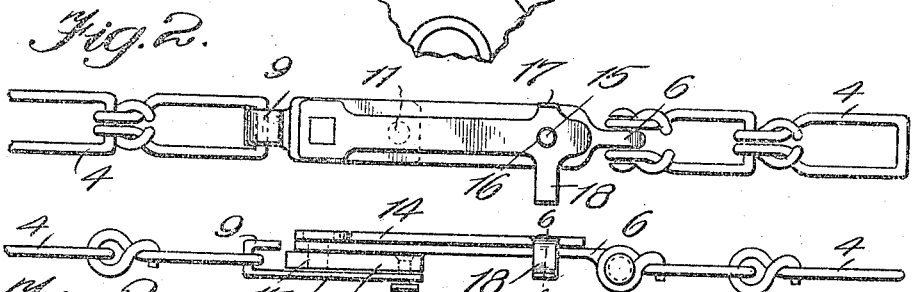
Fig. 2 represents an elevational view of the locking device and adjacent ends of the chain showing the locking device in closed position.
Figure 3:
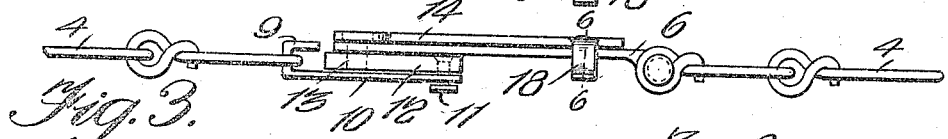
Fig. 3 represents a bottom edge elevation thereof.

Referring more particularly to the drawings, the locking device includes a substantially rectangular flat body portion 5 formed of a strip of metal having an eye 6 offset toward the outer face of the body, said eye being formed at one end of plate 5 and being preferably integral therewith. This eye receives a pin 7 for coupling one terminal link 8 of the circumferential side chain of the anti-slipping chain, to the locking device.

The other end of the chain is engaged on a hook 9 formed at the outer end of a link 10, which link at its inner end is pivoted as at 11 on the outer end of an arm 12. This arm 12 is arranged on the outer side or surface of the body 5 and at its inner end is preferably formed integrally with the pin 13 pivotally mounted in an opening in the body 5 at the end thereof opposite eye 6. This pin 13 at its inner end is square and fits in a squared opening at the inner end of a lever 14. This lever is arranged on the inner side of the body 5, is preferably made of resilient or spring metal, and is preferably riveted in place on the pin 13. The lever 14 is arranged in parallel relation with the arm 12, and is adapted to move the arm in one direction or another for tightening or loosening the chain. The hook 9 formed on the link 10, it will be noticed, is overturned toward the body 5 so that the body will be substantially in alinement with the terminal portion of the chain, when the locking device is applied to the chain.

The body 5 on its inner side adjacent the eye 6, is provided with a lug 15 having a beveled outer end, and this lug coacts with an opening 16 in the outer end of the lever 14, in retaining the lever in locked position. The upper edge of the lever 14 adjacent the opening 16, is provided with a slightly out-turned tongue 17 which is bent away from the plate 5, and which when the lever is moved from open into closed position, first engages the lug 15, and riding upwardly thereon presses the lever out from the plate 5 until the opening 16 registers with the lug 15 whereupon the lever will snap back into place against the plate 5 and will be retained in locked position by engagement with the lug 15. Opposite the tongue 17 the lever is provided with an arm 18 which extends down beneath the lower edge of body 5 and projects outwardly from the front face thereof to form a thumb hold whereby the lever may be operated.

Figures 4, 6:
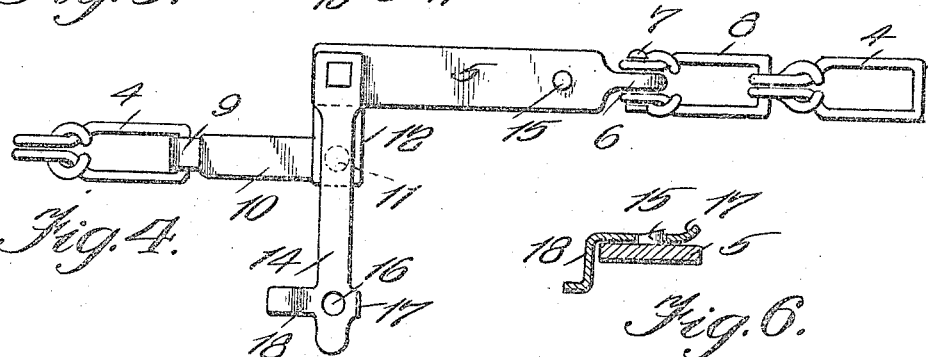
Fig. 4 represents a side elevation showing the device in open position.
Fig. 6 represents a view in section taken transversely on the plane indicated by the line 6—6 of Fig. 3.
Figure 5:
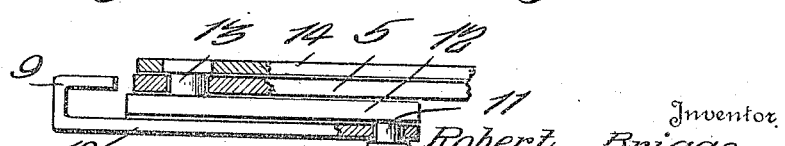
Fig. 5 represents a view partially in section looking toward the edge of the locking device when the same is in closed position.

When it is desired to tighten the side chain subsequently to the anti-skid chain having been placed upon the wheel, the hook 9 is engaged with the free terminal link of the chain, and the position as shown in Fig. 4 will be assumed by the parts. The lever 14 in order to draw the terminals of the chain together, will be swung upwardly, thus moving the arm 12 upwardly and drawing the link 10 inwardly toward the body of the device. As the lever 14 is moved upwardly it gradually tightens the chain, and when it finally assumes locked position, the chain will have been drawn into a taut condition upon the wheel. The lever 14 will remain in its locked position until such time as it is desired to remove the anti-skid chain, at which time the arm 18 will be engaged by the thumb and the arm pressed inwardly to disengage the lug 15, and by then pressing the arm downwardly the lever will be swung into the position indicated in Fig. 4 whereby to release the tension on the chain and to allow of the same being disengaged from the hook 9, so as to allow the removal of the anti-skid chain.

In the preferred form of anti-skid chain device, the same includes the side circumferentially extending chains 4, the inner one of which may, as well as the outer one, be provided with the tightening and locking device. At a suitable point the side chains 4 are connected by the transversely extending parallel tread pieces 3. These tread pieces extend diagonally across the tread portion of the tire, and are connected by the parallel connecting pieces 2 which connect with adjacent pieces 3 near the ends of the latter. The connecting pieces are likewise arranged diagonally in opposed relation to the pieces 3 as shown in Fig. 1. By this arrangement parts of a chain will be under the tread of the wheel at all times.

Although I have described the preferred embodiment of my invention, I may desire to make such changes in the construction, combination and arrangement of parts thereof, as do not depart from the spirit of the invention and the scope of the appended claim.

I claim:

The combination with the side chain of an anti-slipping chain member, of a locking device, comprising a body plate having an eye formed at one end thereof to which eye one terminal of the chain is connected, an arm arranged on one side of the body plate parallel therewith having a pin extending transversely through an opening in the body plate adjacent the end thereof opposite the eye for pivoting the arm on the body plate, a spring lever fixed at one end on the pin on the opposite side of the body plate from the arm and also parallel with the body plate, a link pivotally connected at one end to the free end of the arm and having at its opposite end a hook bent laterally toward the body plate, a lug on the body plate adapted to be engaged in an opening in the lever for securing the latter in locked position, a tongue formed on the lever for initially engaging said lug to allow of the lever engaging thereon, and an arm carried by the lever projecting forwardly of the plate for presenting a thumb hold whereby the lever may be manipulated.

ROBERT BRIGGS.

Witnesses:
NOAH ENSMINGER,
THOMAS A. FRAME.

Copies of this patent may be obtained for five cents each, by addressing the "Commissioner of Patents, Washington, D. C."